(12) United States Patent
Ronca et al.

(10) Patent No.: US 7,940,979 B2
(45) Date of Patent: May 10, 2011

(54) AGGREGATION OF CHECK IMAGE DATA

(75) Inventors: James Ronca, Decatur, GA (US); Garrett C. Briggs, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 814 days.

(21) Appl. No.: 11/864,506

(22) Filed: Sep. 28, 2007

(65) Prior Publication Data

US 2008/0080760 A1    Apr. 3, 2008

Related U.S. Application Data

(60) Provisional application No. 60/827,396, filed on Sep. 28, 2006.

(51) Int. Cl.
*G06K 9/00* (2006.01)
(52) U.S. Cl. .......................... 382/137; 705/45
(58) Field of Classification Search .................. 382/137, 382/138, 139; 705/1.1, 45, 50, 67, 75
See application file for complete search history.

(56) References Cited

U.S. PATENT DOCUMENTS

| | | | |
|---|---|---|---|
| 6,021,202 A | 2/2000 | Anderson et al. | 380/25 |
| 6,181,837 B1 | 1/2001 | Cahill et al. | 382/305 |
| 6,363,164 B1 | 3/2002 | Jones et al. | 382/135 |
| 2006/0184441 A1 | 8/2006 | Haschka et al. | 705/35 |

OTHER PUBLICATIONS

International Search Report and Written Opinion of the International Searching Authority issued in International Application No. PCT/US2007/79975; Mar. 12, 2008; 7 pages.

*Primary Examiner* — Andrew W Johns
(74) *Attorney, Agent, or Firm* — Fish & Richardson P.C.

(57) ABSTRACT

A method includes receiving a request for a first check image and a second check image. The request includes a first identifier associated with the first check image and a second identifier associated with the second check image. The method further includes retrieving the first check image using the first identifier. The method also includes retrieving the second check image using the second identifier. The method further includes transmitting the first check image and the second check image in response to the request.

25 Claims, 5 Drawing Sheets

AGGREGATION OF CHECK IMAGE DATA

CLAIM OF PRIORITY

This application is related to and claims the benefit of priority from U.S. Provisional Application Ser. No. 60/827,396, titled "Aggregation of Imaged Data for Access by a Paying Bank" and filed Sep. 28, 2006, the entire contents of which are hereby incorporated by reference.

TECHNICAL FIELD

This disclosure relates to the processing of financial instruments.

BACKGROUND

In the past, banks exchanged paper instruments in the settlement of checks. The Check Clearing for the 21st Century Act (Check 21) was signed into law on Oct. 28, 2003, and became effective on Oct. 28, 2004. Check 21 is designed to foster innovation in the payments system and to enhance its efficiency by reducing some of the legal impediments to check truncation. Check truncation is the settlement of a check without physically delivering the original instrument. The law facilitates check truncation by permitting the use of a new negotiable instrument called a substitute check, also referred to as an image replacement document (IRD), which permits banks to truncate original checks, to process check information electronically, and to print and deliver substitute checks to banks that want to continue receiving paper checks rather than electronic check information and/or images. A substitute check is the legal equivalent of the original check and includes all the information contained on the original check.

SUMMARY

The disclosure describes various embodiments of systems, methods, and software for managing product development processes. In one embodiment, a method includes receiving a request for a first check image and a second check image. The request includes a first identifier associated with the first check image and a second identifier associated with the second check image. The method further includes retrieving the first check image using the first identifier. The method also includes retrieving the second check image using the second identifier. The method further includes transmitting the first check image and the second check image in response to the request.

The foregoing and other disclosed example methods may be computer implementable. Moreover some or all of these aspects may be further included in respective systems and computer readable media for aggregation of check image data.

The software, computerized methods, and systems may also include the following. Retrieving the first check image may include retrieving the first check image from a first banking entity, and retrieving the second check image may include retrieving the second check image from a second banking entity. Retrieving the first check image may include retrieving the first check image from a banking entity, and retrieving the second check image may include retrieving the second check image from the banking entity. The software, methods, and systems may also include receiving the first identifier in response to a first electronic draft, storing the first identifier, receiving a second identifier in response to a second electronic draft, and storing the second identifier. The first electronic draft may include an automated clearing house (ACH) transaction and/or a deposited check truncation (DCT) transaction. The first identifier may include a universal resource locator (URL) and/or magnetic ink character recognition (MICR) line data. Retrieving the first check image may include transmitting a request to a banking entity for the first check image, wherein the request to the banking entity comprises at least a portion of the first identifier; and receiving the first check image from the banking entity in response to the request to the banking entity. The request to the banking entity may be formatted to conform with a format associated with the banking entity. The first check image may be retrieved from a certified check access provider. The systems, methods, and software may further include verifying an identity associated with the request for the first and second check images; and determining whether the identity is associated with a permission to retrieve the first check image.

The details of one or more embodiments of the invention are set forth in the accompanying drawings and the description below. Other features, objects, and advantages of the invention will be apparent from the description and drawings, and from the claims.

DETAILED DESCRIPTION

Conventional image exchange techniques for clearing checks and other negotiable items presented electronically, hereinafter referred to as electronic drafts, typically require a significant investment of time and resources in establishing and maintaining an infrastructure to handle the image exchange. Image exchange can be handled more efficiently, at least in some cases, through the use of existing systems for communicating electronic financial data that are not necessarily adapted to support image transfers. For example, the automated clearinghouse (ACH) system can be used to exchange electronic check or payment data but is not designed for supporting image exchange. The ACH system can be extended to support image exchange by adding information to exchanged ACH files that can be used to separately retrieve images (e.g., a paying bank can retrieve images through the Internet or other network connection separate from the ACH network). Other systems or processes for transmitting electronic financial data transactions, such as deposited check truncation (DCT), electronic cash letter (ECL), electronic check presentment (ECP), and ECP with paper to follow can similarly be extended to support image exchange.

To process checks, automated check sorting equipment may rely on numeric information that appears at the bottom of checks, which conventionally is printed in magnetic ink. This information is known as the check's magnetic ink character recognition line, or MICR line, and contains information such as the routing number of the bank on which the check is drawn, the account number on which the check is drawn, and the check serial number. The amount of the check may also be included in the MICR line. The MICR line data may be used to uniquely identify a check and/or check image.

Figure 1:
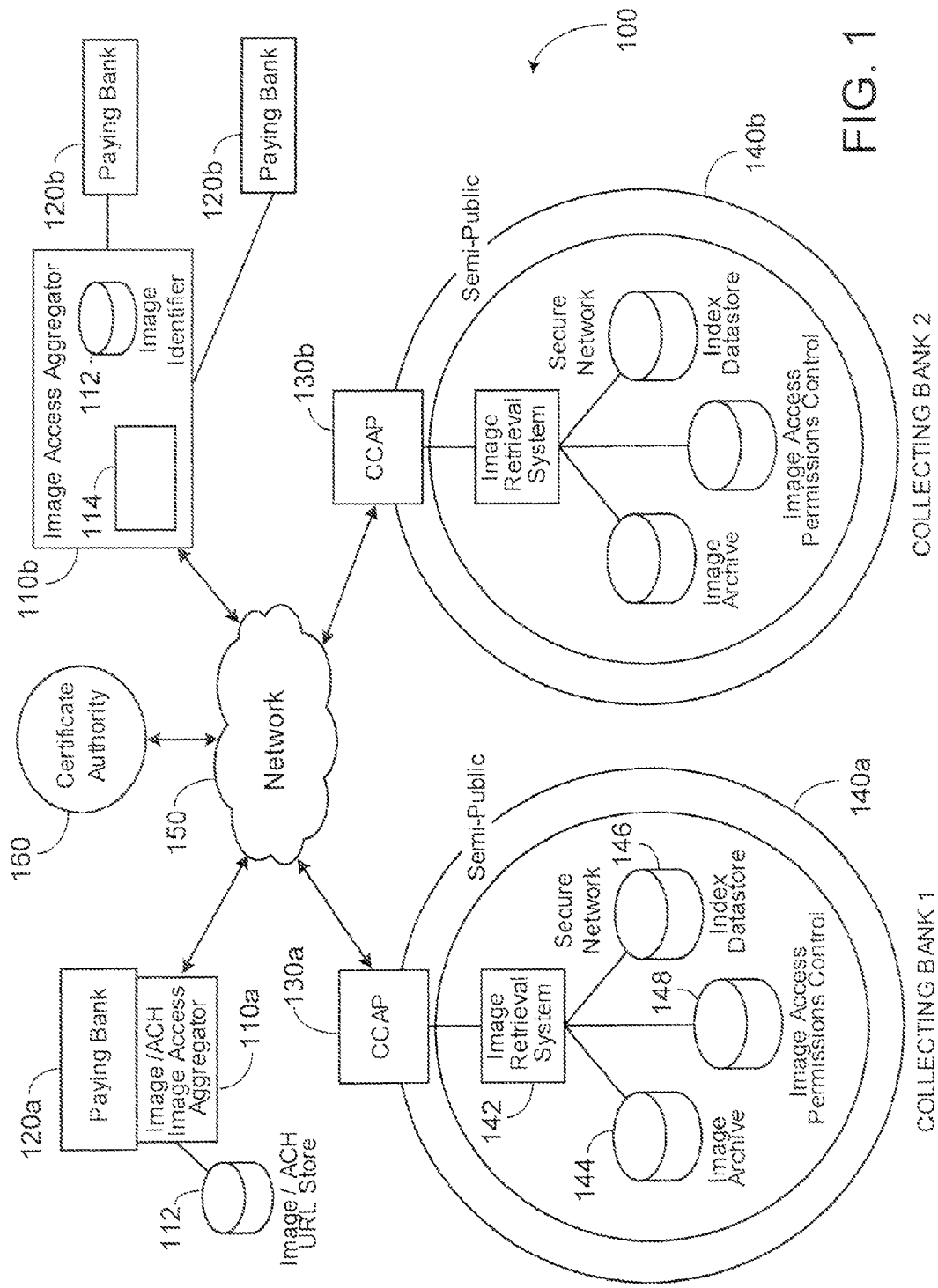
FIG. 1 illustrates an example system for aggregation of check image data.

FIG. 1 illustrates an example system 100 for aggregation of check image data. System 100 generally includes an image access aggregator 110, paying banks 120, certified check access providers (CCAPs) 130, collecting banks 140, and a network 150. A paying bank 120 that has identifying information for one or more checks may request a copy of one or more check images from image access aggregator 110. Image aggregator 110 may re-format the request to obtain the images associated with the checks from one or more CCAPs 130 or directly from a collecting bank 140. The image access aggregator 110 may then return the check images to the paying bank 120. System 100 may allow efficient extension of image exchange processes to banks that may not invest heavily in an imaging infrastructure. System 100 may also enable one or more paying banks to seamlessly retrieve images from multiple collecting banks. Using system 100, the paying bank 120 may not be required to establish separate communications with multiple different collecting banks. System 100 may provide a single user interface front end that may automatically establish communications with multiple collecting banks on the back end. Moreover, system 100 may provide other features, such as web access, automatic or manual sorting and filtering, and indexing, that make image access convenient and simple for paying banks 120. The paying bank 120 also may not be required to maintain image identification information. All, some, or none of these advantages may or may not be present in various embodiments.

The image access aggregator 110 is a computing software and/or hardware device. The image access aggregator 110 may include a data store 112 and a processor 114. The image access aggregator 110 may aggregate and index image identifiers and may provide a search and/or filtering capability for accessing images. For example, for a particular paying bank 120, the image access aggregator may receive image identifiers from multiple collecting banks 140 and can index and store the image identifiers for later use in accessing images from the collecting banks 140 or from electronic archives where one or more collecting banks 140 store check images. Thus, the image access aggregator 110 may provide a single interface to multiple collecting banks 140 and may handle establishing necessary connections with the collecting bank 140 and/or any certified check access provider (CCAP) 130, and may handle authentication and security with multiple collecting banks 140. In response to a single request from the paying bank 120, the image access aggregator 110 may also request and aggregate multiple images from a single collecting bank 140.

The image access aggregator 110 may connect directly to the image retrieval systems 142 or may access CCAPs 130. The image access aggregator 110 may provide an interface, such as a web page, that allows access to check images, either single or bulk access; allows image manipulation, such as zooming and rotating; and/or provides tools for accessing images, such as sorting or filtering. In addition, the image access aggregator 110 may provide caching of the images during an access session or for a certain period of time and can facilitate transfers of image files from one or more collecting banks 140 to a paying bank 120. The image access aggregator may support a single paying bank 120a or multiple paying banks 120b. The image access aggregator 110a may be co-located with a paying bank 120a or may be located offsite (at 110b) and may be owned and/or operated by a paying bank 120a or provided by a vendor and/or outsourcing firm.

The data store 112 may provide a storage location for storing image identifiers. The image identifier may provide identification information for an image or a check. In some implementations, the image identifier may be encrypted to help prevent unauthorized access to images. The image identifiers may be embodied in various formats. For example, the image identifier may be a universal resource locator (URL) that provides a link to the image as stored in an image archive 144. The image identifier is not necessarily a navigable link. The image identifier may be based on, for example, the MICR line data associated with a given check, which may often uniquely identify the given check. The image identifier may also combine various attributes associated with the MICR line data, the payee and payor, the electronic transaction, the paying bank 120, and/or the capturing bank or collecting bank. The image identifier may be included as a field in a conventional ACH file or can be in a separate file (e.g., an addendum file) that accompanies the ACH file. In addition to ACH, other example systems in which the image identifier may be incorporated include, but are not limited to, ECL, ECP, and ECP with paper to follow, DCT, and electronic data interchange (EDI). Indeed, any system of delivering electronic drafts may be used so long as the system delivers information sufficient to identify a check or check image associated with each electronic draft.

The paying bank 120 pays funds after presentment of an electronic draft. The paying bank 120 may have limited or no ability to exchange check images associated with the electronic draft. The paying bank 120 may incorporate or communicate with the image access aggregator 110 (e.g., through a web interface). The paying bank 120 may communicate with the image access aggregator 110 or other devices in system 100 through a network 150.

A CCAP 130 provides image access to a collecting bank's 140 image retrieval system 142. The CCAP 130 may enhance security by providing a secure interface between the secure network of a collecting bank 140 and outside systems, such as an image access aggregator 110. The CCAP 130 may communicate with the image access aggregator 110 and may provide authorization for the image access aggregator 110 to access certain images stored in the image archive 144. The CCAP 130 may be limited in its access of images stored in the image archive 144. The CCAP 130 may verify the identity of the image access aggregator 110 and/or the paying bank 120 using the certificate authority 160.

The collecting bank 140 collects funds after presentment of an electronic draft. The collecting bank 140 may include an image retrieval system 142, an image archive 144, an index data store 146, and an image access permissions control data store 148. The collecting bank 140 may be the bank of first deposit of a check and may capture an image of an original paper check and store the image. The original paper check may be destroyed. The image of the check may be stored in the image archive 144, and information associated with access to the image may be stored in access control 148.

Network 150 facilitates wireless or wireline communication between devices in system 100, such as between image access aggregator 110 and CCAP 130. While illustrated as one network, network 150 may be a logically segregated or distributed network, so long as at least portion of network 150 may facilitate communications between senders and recipients of requests and results. In other words, network 150 encompasses any internal and/or external network, networks, sub-network, or combination thereof operable to facilitate communications between various computing components in system 100. Network 150 may communicate, for example, Internet Protocol (IP) packets, Frame Relay frames, Asynchronous Transfer Mode (ATM) cells, voice, video, data, and other suitable information between network devices. Network 150 may include one or more local area networks (LANs), radio access networks (RANs), metropolitan area networks (MANs), wide area networks (WANs), all or a portion of the global computer network known as the Internet, and/or any other communication system or systems at one or more locations.

The certificate authority 160 facilitates authentication of the various devices connected through network 150. The certificate authority 160, for example, may be used by the CCAP 130 and the image access aggregator 110 to establish a secure authorized connection such that images may be requested and transmitted.

In operation, a collecting bank 140 may process a check using conventional processes, including, for example, reading MICR data and capturing an image of the check. The collecting bank 140 may then generate an electronic draft, using for example ACH. An ACH file may be generated using the MICR line data and an image URL for the image that corresponds to the ACH file. In some embodiments, an image URL is not generated. Other information that aids in the identification of the check may also be in or appended to the ACH file, such as attributes associated with the payee. In some embodiments, the MICR line data alone may be used to identify a check and/or its associated image. The ACH file, along with the identifying information, may then be transmitted through an ACH network provider to a paying bank 120. The image URL, alone or with the ACH file, may be forwarded to an image access aggregator 120, directly from the ACH network or after it is received by the paying bank 120. In some embodiments, the MICR line data is used to identify the check and/or its associated image.

The paying bank 120 may request one or more images of checks associated with electronic drafts that have been presented for payment. The request may be initiated through a graphical user interface (GUI) or through an automated process that transmits the request to the image access aggregator 110. The request may include an identifier associated with the check image. If multiple check images are requested, the image access aggregator 110 may generate one or more image requests depending on the CCAPs 130 through which the images may be retrieved. For example, one check image requested may be associated with collecting bank 140a and only accessible through CCAP 130a, while another requested check image may be accessible only through CCAP 130b. The image access aggregator 110 may communicate requests for the images to the CCAPs 130.

The CCAP 130 may use the image retrieval system 142 of the collecting bank 140 to retrieve the appropriate check images from the image archive 144 and respond to the image access aggregator 110 with the requested images. The collecting bank 140 may respond with the requested image(s) based in part on an access permissions store 148. The image access aggregator 110 may aggregate the images received from the various CCAPs 130 to which image requests were sent, and may respond to the initial request by the paying bank 120 with the aggregated images. In some embodiments, the retrieved image may be provided directly from the collecting bank 140 to the paying bank 120 directly or through the image access aggregator 110. Some portion or all of the retrieval system 142, image archive 144, and/or the access permissions store 148 may be separate from the collecting bank 140, and/or may be provided by an independent entity or an agent of the collecting bank 140 (e.g., a remote archive).

Communications among and between the various entities may be subject to identification verification using, for example, a certificate authority 160 and/or other security measures, such as encryption.

Any of devices of system 100, such as the image access aggregator 110, paying bank 120, CCAP 130, and collecting bank 140, may be implemented with or may be a computer. Each computer comprises an electronic computing device operable to receive, transmit, process and store data associated with system 100. Each computer is generally intended to encompass any suitable processing device and, in some embodiments, memory. Each computer may be, for example, a blade server, general-purpose personal computer (PC), Macintosh, workstation, Unix-based computer, touch screen terminal, network computer, kiosk, wireless data port, wireless or wireline phone, personal data assistant (PDA), one or more processors within these or other devices, or any other suitable device. In other words, the present disclosure contemplates computers other than general purpose computers as well as computers without conventional operating systems. Each computer may be adapted to execute any operating system including Linux, UNIX, Windows Server, or any other suitable operating system. According to one embodiment, a computer may also include or be communicably coupled with a web server and/or a mail server.

To provide for interaction with a user, each computer may have a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. The user interface may be implemented as a graphical user interface, command line interface, or any other suitable computer-implemented interface. Both the input device and output device may include fixed or removable storage media such as a magnetic computer disk, CD-ROM, or other suitable media to both receive input from and provide output to users of system 100 through the display.

Each processing device, such as processor 114, executes instructions and manipulates data to perform the operations of the computer such as, for example, a central processing unit (CPU), a blade, an application specific integrated circuit (ASIC), or a field-programmable gate array (FPGA). Generally, the processing device will be operatively coupled to receive data and/or instructions from, or transfer data to, the computer's memory, such as data store 112. The processing device and some or all of the data stored in the memory can be supplemented by, or incorporated in, special purpose logic circuitry, such as an application-specific integrated circuit.

Figure 2:
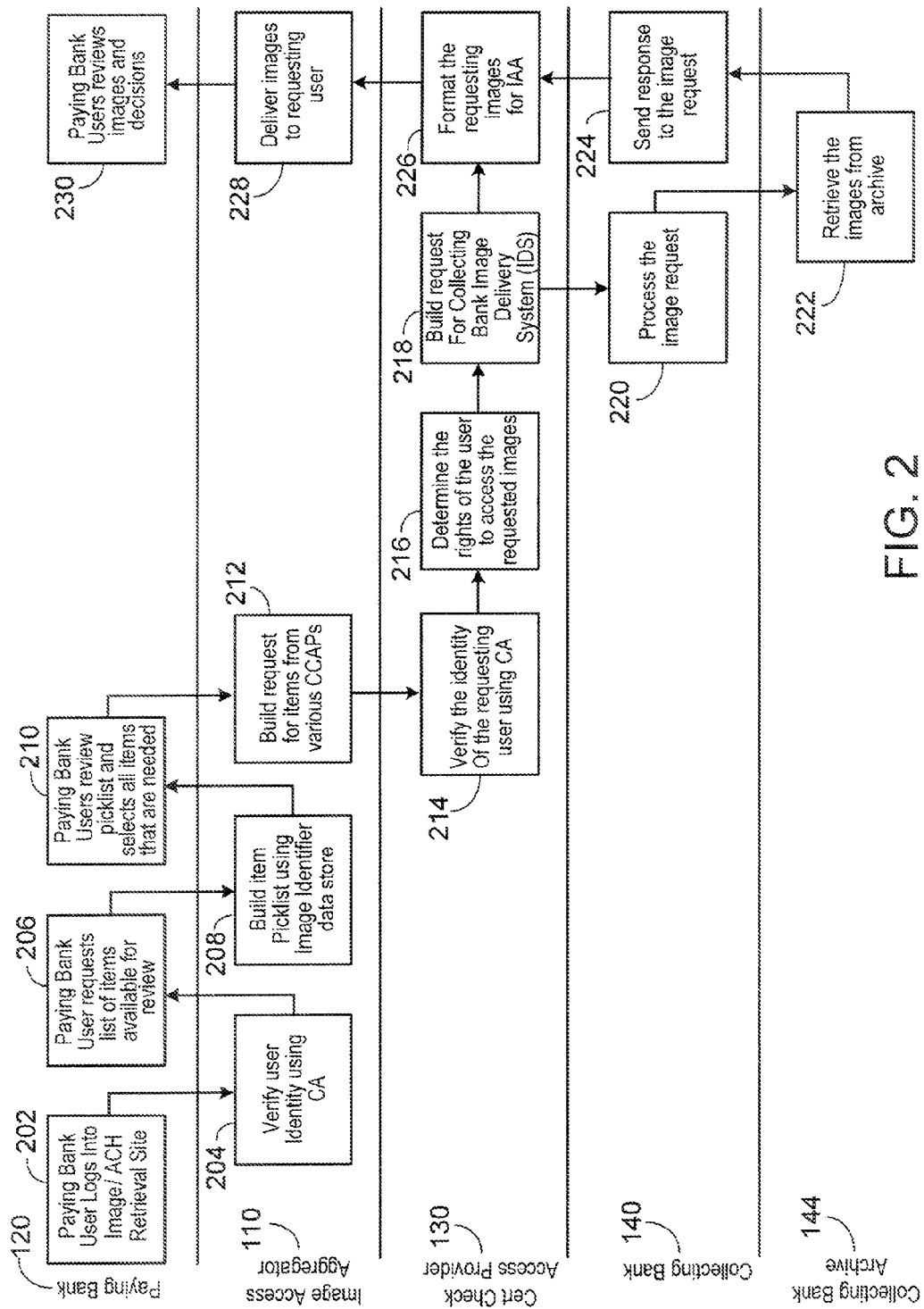
FIG. 2 is a flow diagram illustrating aggregation of check image data.

FIG. 2 is a flow diagram illustrating aggregation of check image data. At step 202, a paying bank user 120 may log into an image retrieval website that is hosted by an image access aggregator 110. The image access aggregator 110 may authenticate the paying bank user 120 using certificate authority 160 at step 204. At step 206, the user 120 may request a list of check items that are available for review through the image access aggregator 110. The image access aggregator 110 may access the image identifiers data store 112 to determine a list of items for which the user 120 may request images. At step 210, the user 120 may review the list of items and select one or more items to request their corresponding images. At step 212, the image access aggregator 110, for each CCAP 130 through which one or more check images may be retrieved, may generate a request that includes check items associated with the appropriate CCAP 130. If the CCAP 130 requires a certain format for requests, the image access aggregator 110 may format the check items at this step. Each request is transmitted to the appropriate CCAP 130.

At step 214, the CCAP 130 may receive a request from and authenticate the image access aggregator 110. The authentication may be facilitated by the certificate authority 160. At step 216, the CCAP 130 may determine the access rights of the user 120 and/or the image access aggregator 110 to retrieve the requested images. At step 218, the CCAP 130 may request the images from the internal system of the collecting bank 140 through an image delivery system or image retrieval system 142. At steps 220, 222, and 224, the collecting bank 140 may process the request, retrieve the images from the image archive 144, and return the retrieved images to the CCAP 130. At step 226, the CCAP may format the results as appropriate and transmit the results to the image access aggregator 110. At step 228, the image access aggregator 110 may deliver the requested images to the user 120. Before delivering the images, the image access aggregator 110 may compile or aggregate the results received from each CCAP 130 to which requests for images were sent at step 212. At step 230, the user 120 receives the requested images.

Figure 3:
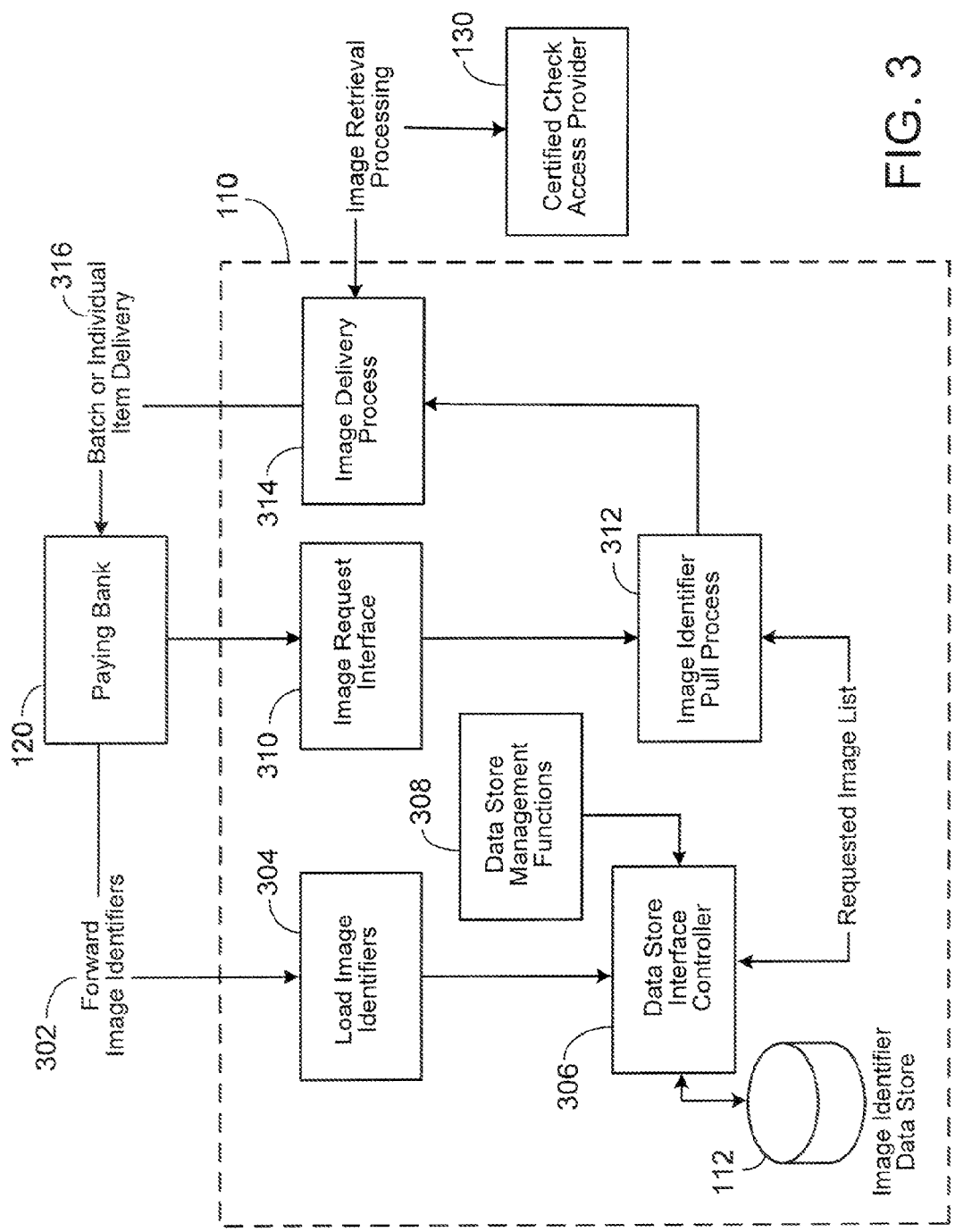
FIG. 3 illustrates functional blocks of an example image access aggregator.

FIG. 3 illustrates functional blocks of an example image access aggregator. A paying bank 120 may forward image identifiers (at 302) to the image access aggregator 110. The paying bank 120 may forward the identifiers on an ad hoc basis as it receives electronic drafts or it may forward the identifiers in a batch process on a regular or as needed basis. The identifier may be included in the electronic draft, such as a URL in or appended to an ACH file. The identifier may be derived from, generated from, or otherwise based on information contained in the electronic draft, such as the MICR line data. The identifier may be a combination of attributes associated with the electronic draft, the collecting bank, the payee, the payor, and/or the paying bank. The image identifiers are loaded using functional block 304. An interface controller 306 and data store management functions 308 may be used to coordinate, create, read, update, and delete tasks targeted to image identifier data store 112.

The paying bank 120 may request one or more images using image request interface 310. The image identifiers for the requested check images may be retrieved with an image identifier pull process 312 using the interface controller 306 and/or the management functions 308. The list of identifiers may then be used by the image delivery process 314 to retrieve the images from the CCAPs 130. The retrieved images may then be delivered (at 316) to the paying bank using a batch or individual item delivery process.

Figure 4:
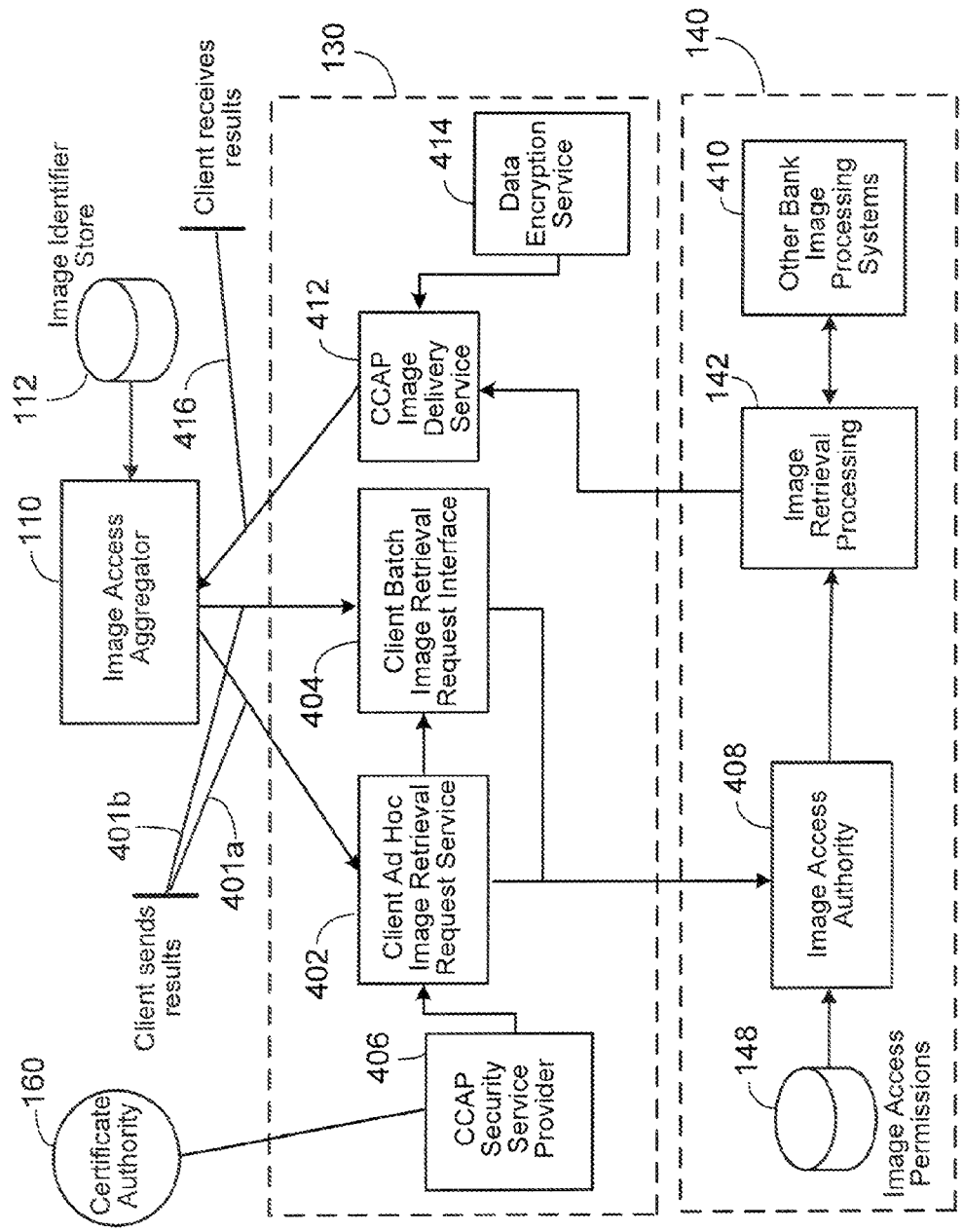
FIG. 4 illustrates functional blocks of an example certified check access provider.

FIG. 4 illustrates functional blocks of an example certified check access provider. The image access aggregator 110 may request an individual image (at 401a) or multiple images (at 401b) from the CCAP 130. The processes for the ad hoc image retrieval 402 and the batch image retrieval 404 may use the security service 406 to authenticate the request 401 from the image access aggregator 110. The security service 406 may utilize the certificate authority 160 to facilitate the authentication. The image access authority 408 associated with the collecting bank 140 may receive requests for images from the CCAP 130 through process 402 and 404. The image access authority 408 may authorize the all, part or none of the image request using the image access permissions 148. The image access permissions 148 may allow subsidiaries of a bank to have the same permissions as the parent bank. The image retrieval processing 142 retrieves the images that were authorized to be returned using the image processing system 410 of the collecting bank 140. The retrieved images may be received by the CCAP image delivery system 412. The delivery system 412 may use data encryption service 414 to encrypt the data before returning the results (at 416).

Figure 5:
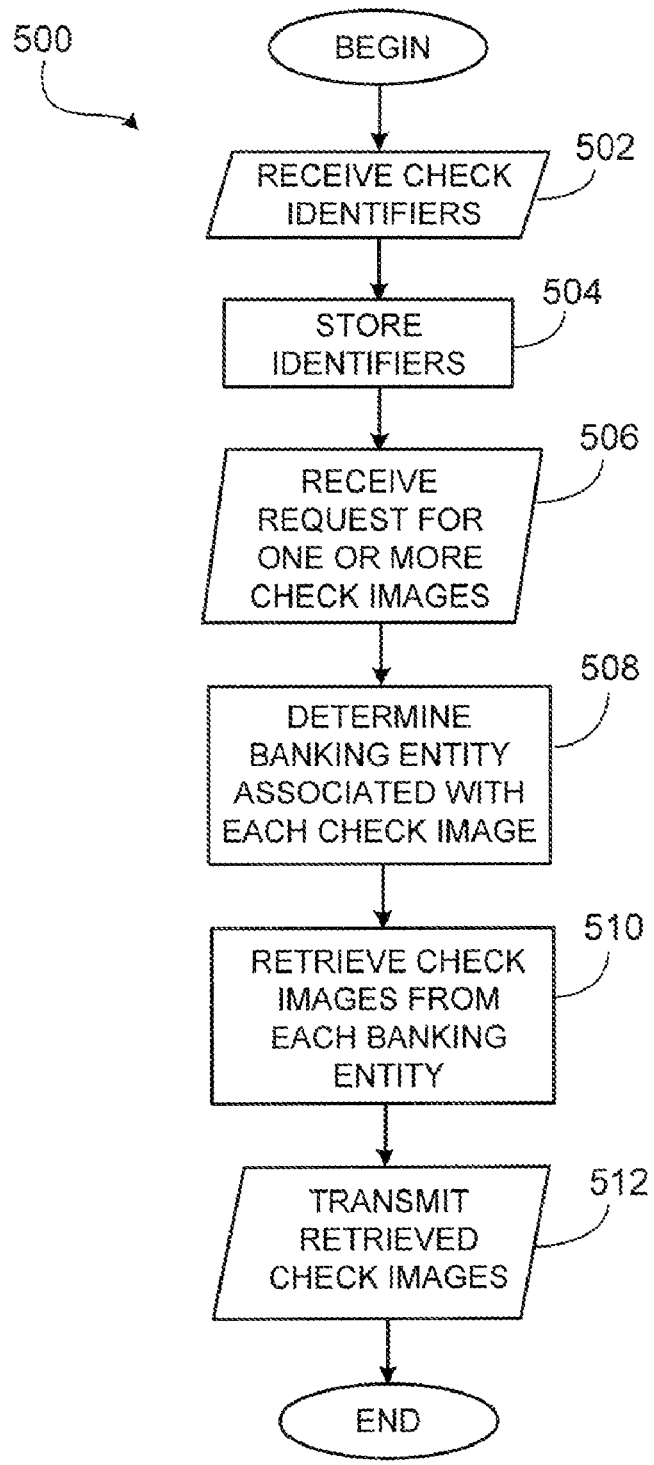
FIG. 5 is a flowchart illustrating an example method for aggregation of check image data.

FIG. 5 is a flowchart illustrating an example method for aggregation of check image data. At step 502, check identifiers may be received. The check identifiers may be forwarded by a paying bank 120 on an individual ad hoc or batch process. Each check identifier may uniquely identify a check and/or its corresponding image. The check identifier may be a URL that links to a stored check image. The check identifier may be all or a portion of the MICR data associated with the check. The check identifier may be generated based on the check's associated MICR data, amount, payee, collecting bank, paying bank, electronic draft information, or any other data that may be used to identify a check and/or its corresponding image. At step 504, the check identifiers are stored. The identifiers may also be indexed.

At step 506, a request for one or more check images may be received. The request may include check identifiers or may include information from which the check identifiers may be determined. For example, the request may be for all images associated with a particular paying bank. In this case, the image identifiers may be determined using attributes associated with the particular bank. At step 508, the check identifiers may be grouped by banking entity. That is, a particular check identifier may be grouped based on the banking entity from which the image corresponding to the particular check identifier may be retrieved. Each group may be formatted into a request file that is used to retrieve that group's corresponding images from the group's respective banking entity. The banking entity may be a CCAP 130, a collecting bank 140, or any other entity associated with the retrieval of check images.

At step 510, check images are retrieved from each banking entity that has access to the previously stored check images. The retrieved images may be gathered or aggregated from multiple banking entities. At step 512, the retrieved check images are formatted and returned in response to the initial request at step 506. The formatting may be based on the type of request received, such as batch or individual, on the requesting entity, or any number of other factors, such as the purpose of the request.

The preceding flowchart and accompanying description illustrate example methods 500. It will be understood that this illustrated method is for example purposes only and that the described or similar techniques or processes may be performed at any appropriate time, including concurrently, individually, or in combination. In addition, many of the steps in this flowchart may take place simultaneously and/or in different orders than as shown. Moreover, methods may be used with additional steps, fewer steps, and/or different steps, so long as the methods remain appropriate.

Embodiments of the subject matter and the functional operations described in this specification can be implemented in digital electronic circuitry, or in computer programs or software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. Indeed, a computer program may be written or described in any appropriate computer language including C, C++, Java, Visual Basic, assembler, Perl, any suitable version of 4GL, as well as others. Portions of a computer program may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET. A portion of a computer program may be a web service that is remotely called, while another portion of a computer program may be an interface object bundled for processing at remote client. Moreover, a computer program may be a child or sub-module of another computer program without departing from the scope of this disclosure.

A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In some embodiments, some or all of the foregoing data structures may be stored in one or more tables in a relational database described in terms of SQL statements or scripts. In some alternative or complimentary situations, some or all of the foregoing data structures may be formatted, stored, or defined as various data structures in text files, eXtensible Markup Language ("XML") documents, Virtual Storage Access Method ("VSAM") files, flat files, Btrieve files, comma-separated-value ("CSV") files, internal variables, or one or more libraries. In short, the foregoing data structures may comprise one table or file or a plurality of tables or files stored on one computer or across a plurality of computers in any appropriate format. Indeed, some or all of the foregoing data structures may be local or remote without departing from the scope of this disclosure and store any type of appropriate data.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments of the invention have been described. Nevertheless, it will be understood that various modifications may be made without departing from the spirit and scope of the invention. For example, the actions recited in the claims can be performed in a different order and still achieve desirable results. Accordingly, other embodiments are within the scope of the following claims.

What is claimed is:

1. A computer-implemented method performed by at least one processor, the method comprising:
    receiving a first request for a check image at a server adapted to retrieve check images associated with a plurality of financial institutions;
    identifying a first financial institution associated with the check image;
    generating a second request for the check image, the second request for the check image formatted to conform with a format associated with the first financial institution;
    sending the second request for the check image to a server adapted to receive requests for check images for the first financial institution;
    receiving the check image in response to the second request; and
    transmitting the received check image in response to the first request.

2. The method of claim 1, wherein the first request further includes a request for a second check image, the method further comprising:
    identifying a second financial institution associated with the second check image;
    generating a third request for the second check image, the third request for the second check image formatted to conform with a format associated with the second financial institution;
    sending the third request for the second check image to a server adapted to receive requests for check images for the second financial institution;
    receiving the second check image in response to the third request; and
    transmitting the received second check image in response to the first request.

3. The method of claim 2, wherein the format associated with the second financial institution is different from the format associated with the first financial institution.

4. The method of claim 1 further comprising:
    receiving a third request for a second check image;
    identifying the first financial institution as a financial institution associated with the second check image;
    generating a fourth request for the second check image, the fourth request for the second check image formatted to conform with the format associated with the first financial institution;
    sending the fourth request for the second check image to a server adapted to receive requests for check images for the first financial institution;
    receiving the second check image in response to the fourth request for the second check image; and
    transmitting the second check image in response to the third request.

5. The method of claim 1, wherein the second request further includes an identifier of the check image.

6. The method of claim 5, wherein the identifier comprises at least one of: a universal resource locator (URL) or magnetic ink character recognition (MICR) line data.

7. The method of claim 5, wherein the identifier of the check image is obtained from an electronic draft associated with a check represented in the check image.

8. The method of claim 7, wherein the electronic draft comprises at least one of: an automated clearing house (ACH) transaction and a deposited check truncation (DCT) transaction.

9. The method of claim 1, wherein the check image is retrieved from a certified check access provider.

10. The method of claim 1, further comprising verifying an identity associated with the request for the first check image; and determining whether the identity is associated with a permission to retrieve the check image.

11. A non-transitory computer readable medium having instructions for causing a processor to perform operations comprising:
    receiving a first request for a check image;
    identifying a first financial institution associated with the check image;
    generating a second request for the check image, the second request formatted to conform with a format associated with the first financial institution;
    sending the second request for the check image to a server adapted to receive requests for check images for the first financial institution;
    receiving the check image from the first financial institution; and
    transmitting the check image in response to the first request.

12. The computer readable medium of claim 11, wherein the first request further includes a request for a second check image, the medium having instructions for further causing a processor to perform operations comprising:
    identifying a second financial institution associated with the second check image;
    generating a third request for the second check image, the third request for the second check image formatted to conform with a format associated with the second financial institution;
    sending the third request for the second check image to a server adapted to receive requests for check images for the second financial institution;
    receiving the second check image in response to the third request; and
    transmitting the received second check image in response to the first request.

13. The computer readable medium of claim 12, wherein the format associated with the second financial institution is different from the format associated with the first financial institution.

14. The computer readable medium of claim 11 having instructions for further causing a processor to perform operations comprising:
    receiving a third request for a second check image;
    identifying the first financial institution as a financial institution associated with the second check image;
    generating a fourth request for the second check image, the fourth request for the second check image formatted to conform with the format associated with the first financial institution;

sending the fourth request for the second check image to a server adapted to receive requests for check images for the first financial institution;

receiving the second check image in response to the fourth request for the second check image; and transmitting the second check image in response to the third request.

15. The computer readable medium of claim 11, wherein the second request further includes an identifier of the check image.

16. The computer readable medium of claim 15, wherein the first identifier comprises at least one of: a universal resource locator (URL) or magnetic ink character recognition (MICR) line data.

17. The computer readable medium of claim 15, wherein the identifier of the check image is obtained from an electronic draft associated with a check represented in the check image.

18. The computer readable medium of claim 17, wherein the first electronic draft comprises at least one of: an automated clearing house (ACH) transaction and a deposited check truncation (DCT) transaction.

19. The computer readable medium of claim 11 having instructions further comprising verifying an identity associated with the request for the first check image; and determining whether the identity is associated with a permission to retrieve the check image.

20. A system for aggregation of check image data, comprising:

memory operable to store a plurality of image identifiers; and one or more processors communicatively coupled to the memory, operable to:

receive a first request for a check image;

identify a first financial institution associated with the check image;

generate a second request for the check image, the second request for the check image formatted to conform with a format associated with the first financial institution, the second request including an identifier of the check image identified from the plurality of image identifiers;

send the second request for the check image to a server adapted to receive requests for check images for the first financial institution;

receive the check image in response to the second request using the identifier; and transmit the check image in response to the first request.

21. The system of claim 20, wherein the processor is further operable to:

receive a third request for a second check image;

identify a second financial institution associated with the second check image;

generate a fourth request for the second check image, the fourth request for the second check image formatted to conform with a format associated with the second financial institution;

send the fourth request for the second check image to a server adapted to receive requests for check images for the second financial institution;

receive the second check image in response to the fourth request; and transmitting the second check image in response to the third request.

22. The system of claim 21, wherein the format associated with the second financial institution is different from the format associated with the first financial institution.

23. The system of claim 21, wherein the processor is further operable to verify an identity associated with the requests for the first and second check images; and determine whether the identity is associated with a permission to retrieve the first check image.

24. The system of claim 20, wherein the identifier comprises at least one of: a universal resource locator (URL) or magnetic ink character recognition (MICR) line data.

25. The system of claim 20, the check image is retrieved from a certified check access provider.

* * * * *